(12) United States Patent
Hansen et al.

(10) Patent No.: US 6,348,995 B1
(45) Date of Patent: Feb. 19, 2002

(54) REFLECTIVE OPTICAL POLARIZER DEVICE WITH CONTROLLED LIGHT DISTRIBUTION AND LIQUID CRYSTAL DISPLAY INCORPORATING THE SAME

(75) Inventors: Douglas P. Hansen, Spanish Fork, UT (US); John Gunther, Torrance, CA (US)

(73) Assignee: Moxtek, Orem, UT (US)

( * ) Notice: Subject to any disclaimer, the term of this patent is extended or adjusted under 35 U.S.C. 154(b) by 0 days.

(21) Appl. No.: 09/536,874

(22) Filed: Mar. 27, 2000

Related U.S. Application Data

(62) Division of application No. 09/116,715, filed on Jul. 16, 1998, now Pat. No. 6,081,376.

(51) Int. Cl.[7] ................................................. G02B 5/30
(52) U.S. Cl. ........................ 359/486; 359/483; 349/96
(58) Field of Search ................................. 359/485, 483, 359/599, 488, 487, 486; 349/64, 96

(56) References Cited

U.S. PATENT DOCUMENTS

| | | | |
|---|---|---|---|
| 3,731,986 A | 5/1973 | Fergason | 349/33 |
| 4,049,944 A | 9/1977 | Garvin et al. | 219/121 |
| 4,289,381 A | 9/1981 | Garvin et al. | 427/38 |
| 4,514,479 A | 4/1985 | Ferrante | 430/2 |
| 4,688,897 A * | 8/1987 | Grinberg et al. | 359/599 |
| 4,840,757 A | 6/1989 | Blenkhorn | 264/22 |
| 5,177,635 A | 1/1993 | Keilmann | 359/486 |
| 5,204,765 A | 4/1993 | Mitsui et al. | 359/70 |
| 5,279,689 A | 1/1994 | Shvartsman | 156/220 |
| 5,466,319 A | 11/1995 | Zager et al. | 156/220 |
| 5,559,634 A | 9/1996 | Weber | 359/487 |
| 5,609,939 A | 3/1997 | Petersen et al. | 428/141 |
| 5,751,388 A * | 5/1998 | Larson | 349/96 |
| 5,838,403 A | 11/1998 | Jannson et al. | 349/65 |
| 5,991,077 A * | 11/1999 | Carlson et al. | 359/500 |

OTHER PUBLICATIONS

Dainty, Bruce and Sant, "Measurements of Light Scattering by a Characterized Random Rough Surface," Waves in Random Media (1991) S29–S39.

Lavin, *Specular Reflection*, Monographs on Applied Optics No. 2, pp. 26–35.

* cited by examiner

Primary Examiner—Cassandra Spyrou
Assistant Examiner—Euncha Cherry
(74) Attorney, Agent, or Firm—Thorpe North & Western

(57) ABSTRACT

An optical polarizer device that reflects light of one polarization over a controlled angular range, and improved twisted nematic liquid crystal display devices incorporating the same, is comprised of a grid of conductive elements supported on a textured substrate such that light of one polarization is transmitted through the grid while light of the orthogonal polarization is reflected. The angular distribution of the reflected light is determined by the texture of the substrate. Liquid crystal display embodiments include a configuration intended exclusively for front illumination by ambient light and a configuration which may use either front-illumination or back illumination by an internal light source.

51 Claims, 6 Drawing Sheets

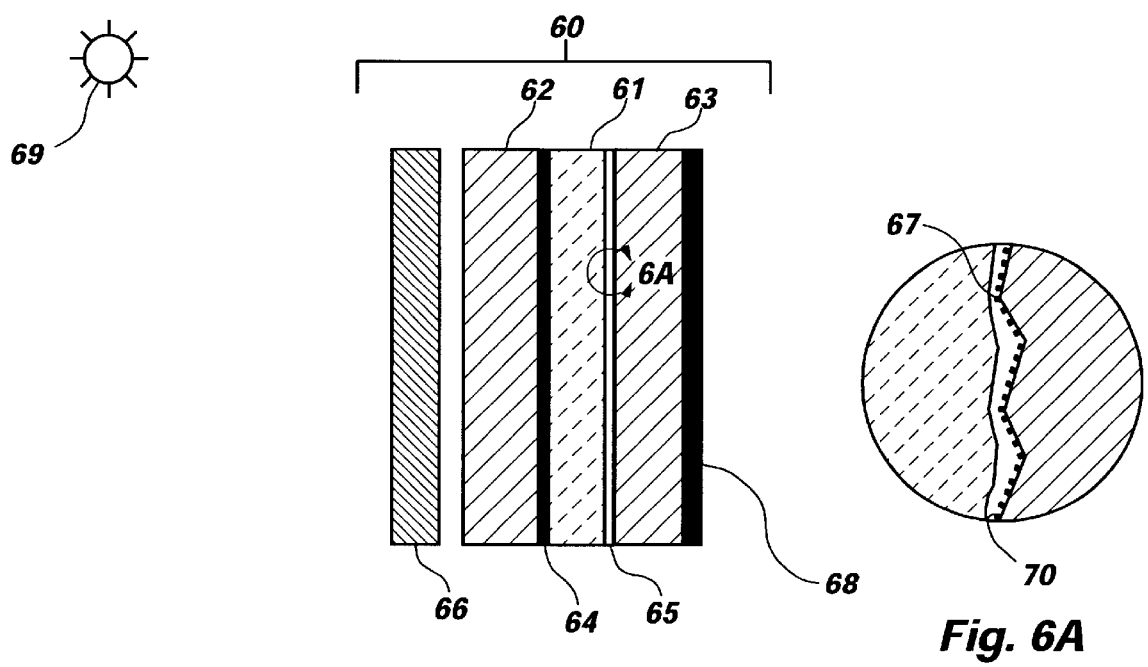
Fig. 6
Fig. 6A
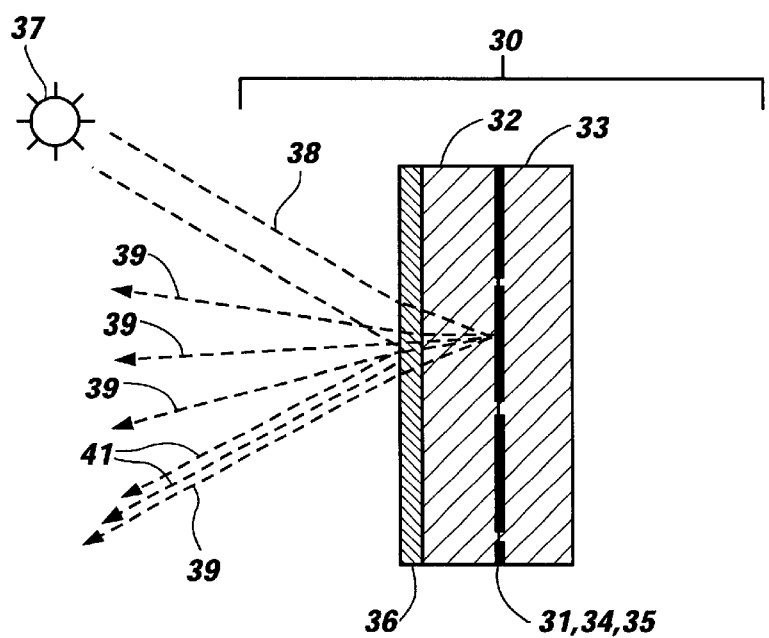
Fig. 7

REFLECTIVE OPTICAL POLARIZER DEVICE WITH CONTROLLED LIGHT DISTRIBUTION AND LIQUID CRYSTAL DISPLAY INCORPORATING THE SAME

This is a Division of U.S. patent application Ser. No. 09/116,715, filed Jul. 16, 1998, now U.S. Pat. No. 6,081,376.

BACKGROUND OF THE INVENTION

1. Field of the Invention

The present invention relates to a diffuse and a non-specularly reflective polarizer device, particularly well suited for liquid crystal displays. More particularly, the present invention relates to a polarizer device with a plurality of thin, elongated elements for (i) transmitting light having a first polarization orientation perpendicular to the elements, and (ii) reflecting light having a second polarization orientation parallel with the elements, and wherein the elongated elements each have an exposed surface which together define a textured surface for reflecting the second polarization in a diffuse manner, or in a non-specular manner with respect to a reference plane.

2. Prior Art

A typical liquid crystal display device comprises a layer of liquid crystal material sandwiched between front and back transparent plates. Transparent electrodes are located on the inner surfaces of the transparent plates and used to apply electrical signals which alter the light transmission properties of the liquid crystal layer. The transparent electrodes are typically patterned to define the pixel structure of the display device.

The preferred and most commonly used form of liquid crystal display utilizes the well-known "twisted nematic" liquid crystal effect. The twisted nematic effect is preferred because it offers excellent contrast ratio, low driving voltages and a sharp response threshold compatible with current drive circuit technology, wide viewing angle, and good gray-scale rendition.

In a twisted nematic liquid crystal display, the display sandwich also includes linear polarizers affixed to the outer surfaces of the front and back transparent plates and having orthogonal axes of polarization. The liquid crystal layer is designed such that the polarization vector of light transmitted through the layer is rotated 90 degrees in the absence of an applied electric field, but not rotated in the presence of an electric field. Thus, in the absence of an electric field, the light transmitted through one polarizer is reoriented to pass through the opposing polarizer such that the panel is transparent and appears bright to the observer. In the presence of an electric field, the light transmitted by one polarizer is not rotated and is if thus blocked by the second polarizer. Thus the panel is opaque and appears dark to the viewer. In this manner, the transparent electrodes can be used to apply electric fields to selected areas of the panel to create a visible image in the form of light and dark pixels.

In many applications, the liquid crystal display device is illuminated by a light source located behind the rear side of the sandwich and viewed from the opposing side. In this case the visible image is created by light that passes through the panel a single time. However, in some applications, such as portable communications equipment, low power consumption is critical and the display is illuminated primarily by ambient light. In this case, a reflective element is located behind the liquid crystal sandwich such that the ambient light passes through the sandwich, reflects from the reflective element, and passes again through the sandwich in the opposing direction to the viewer. Thus the image seen by the viewer is formed by light which has passed through the liquid crystal device twice.

The problems with current ambient-illuminated twisted nematic liquid crystal devices relate to the fact that the light passes through the device twice. The most significant problem, normally referred to as "parallax", occurs because the reflector is located behind the rear transparent plate and the rear linear polarizer at a considerable distance from the liquid crystal layer. The ambient light entering the display is spatially modulated by the liquid crystal layer to form a pattern of light and dark areas where the light impinges upon the rear reflector. After reflection, the light passes through the liquid crystal device in the reverse direction and is again spatially modulated. However, since the display is normally illuminated and viewed at oblique angles with respect to the display surface, the images formed by the two passes through the liquid sandwich generally do not overlap, and a double image, or shadow image, is seen by the viewer under most conditions. Although the shadow image is currently accepted for low resolution displays such as those used in portable phones and calculators, this phenomenon does limit the resolution, or minimum pixel size, of ambient illuminated twisted nematic liquid crystal displays, and prevents their application in products which require high information-density displays, such as lap-top computers.

An additional problem with current ambient illuminated twisted nematic liquid crystal displays is the additional loss of brightness that occurs due to absorption in the linear polarizers. Note that this would not be a problem with theoretical polarizers that transmit 100% of one polarization while absorbing 100% of the orthogonal polarization. However, current linear polarizers only transmit 90% or less of the preferred polarization. The additional absorption during the second pass through the liquid crystal sandwich results in a loss of at least 20% of the possible display brightness.

Alternate methods have been proposed to eliminate the parallax problem in ambient illuminated twisted nematic liquid crystal displays. One method, as described in U.S. Pat. Nos. 4,492,432 and 5,139,340, is to utilize an alternate liquid crystal electro-optical effect that only requires a polarizer on the front side of the display. Since the rear polarizer is not required, the rear reflector can be located on the inner surface of the rear transparent plate in immediate proximity to the liquid crystal layer. While this method eliminates the parallax problem, displays using this method do not provide the high contrast, wide viewing angle, fast response, and smooth gray scale rendition provided by twisted nematic liquid crystal display devices.

Still another method is the Polymer Dispersed Liquid Crystal Display (PDLC) in which the liquid crystal layer itself functions as a diffuse reflector, eliminating the need for polarizers or a separate reflector. While this method offers the potential for high display brightness, the PDLC requires high drive voltages and complex drive waveforms that are not compatible with current drive circuit technology. Given these problems with alternative technologies, it would be an advancement in the art to develop a display technology which retains the advantages of the twisted nematic liquid crystal technology while eliminating the parallax problem.

U.S. Pat. No. 4,688,897, issued to Grinberg, proposes to improve ambient illuminated twisted nematic liquid crystal displays by incorporating a wire grid reflective polarizer within the twisted nematic liquid crystal device. The wire grid functions as the rear polarizer, as a specular reflector, and as the rear electrical contact to the liquid crystal layer. While this approach does eliminate the parallax by virtue of having the rear reflector in intimate contact with the liquid crystal layer, it does so by sacrificing many of the other attractive features of the twisted nematic display by using a specular, rather than a diffuse, reflector.

It has long been recognized that a specular reflector is not acceptable in ambient illuminated liquid crystal displays for three reasons. First, the specularly reflected display image must be viewed along the same axis as the specular reflections that occur naturally from the front surface and internal surfaces of the display sandwich. These surface reflections (which are not spatially modulated to form an image) may be 5% or more of the incident light. Because of the absorption of the polarizing elements, the maximum brightness of the display image cannot be more than 40% of the incident light. Thus the maximum possible contrast ratio for the display is 40%/5% or 8:1, and may be much less. Second, the viewing angle and brightness of a display with a specular reflector are determined strictly by the illumination source. For example, while the performance of the display might be acceptable under diffuse interior illumination, the viewing angle would be extremely small when illuminated by a point source, and the brightness of the display would be beyond the capacity of the human visual system when viewed under direct sunlight. Third, displays with specular reflectors commonly have objectionable color fringes caused by interference between the multiple reflections within the device. For these reasons, the above proposal, while moving the polarizer and reflector into the liquid crystal cell to eliminate the problem of parallax, does not provide an improved ambient-illuminated liquid crystal display device. Thus, there still exists a need for a substantially improved ambient-illuminated display that overcomes the parallax problem while maintaining the performance advantages of the twisted nematic liquid crystal effect.

Therefore, it would be advantageous to develop a liquid crystal display device with reduced parallax, or a polarizer device capable of reducing or eliminating parallax. It would also be advantageous to develop a polarizer device capable of diffusely reflecting light. It would also be advantageous to develop a polarizer device capable of reflecting one polarization in a non-specular manner.

OBJECTS AND SUMMARY OF THE INVENTION

It is an object of the present invention to provide a polarizer device for separating a source light beam into two orthogonally polarized components, one of which is either absorbed or transmitted and the other of which is diffusely reflected over a controlled angular range, or reflected in a non-specular manner.

It is another object of the present invention to provide an improved ambient-illuminated liquid crystal display device having low drive voltages compatible with existing drive circuits, high contrast, high resolution free of parallax effects and ghost images, and controlled viewing angle.

These and other objects and advantages of the present invention are realized in a polarizer device having a parallel arrangement of a plurality of thin, elongated elements each having an exposed surface which together form a textured surface. The arrangement of elements is disposed in a source light beam for (i) transmitting light having a polarization orientation perpendicular to the elements, and (ii) reflecting light having a polarization orientation parallel with the elements.

A majority of the arrangement of elongated elements share a common general orientation with a reference plane and a common reference axis normal with respect to the reference plane. The exposed surfaces of the elements define a plurality of component surfaces which define the textured surface. Therefore, the plurality of the component surfaces of the textured surface each reflect light of one polarization, but in a diffuse manner, or at various angles.

The component surfaces each have a component axis normal with respect to the component surface. A majority of the component surfaces are not coplanar or parallel with the reference plane. Thus, the component surfaces have different elevations with respect to an effective mean height. A majority of the component axes of the component surfaces form a range of different angles with respect to the common reference angle. A plurality of the component surfaces have an elevated portion defining a peak and a lowered portion defining a valley. Each component surface has a size or diameter between opposite sides of the component surface. The diameter may be taken parallel with the elongated elements. A majority of the textured surface is formed by component surfaces with diameters or distances greater than the wavelength of visible or near visible light.

The exposed surfaces of the elongated elements also define a cross section which may be wavy. The wavy cross section may be periodic or irregular. In addition, the wavy cross section may be defined by curved surfaces or planar surfaces. The exposed surfaces may also define a plurality of indentations or protrusions. The protrusions may be convex or planar. Similarly, the indentations may be concave or planar.

The polarizer device may also have a substrate upon which the arrangement of elements is disposed. The substrate may have a surface which is textured, forming a corresponding textured surface for the exposed surfaces of the elements.

Alternatively, a majority of the axes of the component surfaces may have a similar orientation with respect to the reference axis, but a different angular value from the reference axis to reflect light of the second polarization in a non-specular manner with respect to the reference plane.

The polarizer device may form the polarizer and diffuse reflector behind the liquid crystal material. In addition, the polarizer device may provide electrical contact, or establish an equal potential plane, to function as an electrode and generate an electric field across the liquid crystal material. A plurality of shorting bars may be electrically coupled to segments of the arrangement of elements to assure adequate electrical contact.

These and other objects, features, advantages and alternative aspects of the present invention will become apparent to those skilled in the art from a consideration of the following detailed description taken in combination with the accompanying drawings.

DESCRIPTION OF THE DRAWINGS

FIG. 6 is a cross sectional view of a liquid crystal display device incorporating the diffuse reflecting polarizer in accordance with another embodiment of this invention.

FIG. 6A is an enlarged cross sectional view of the liquid crystal display device incorporating the diffuse reflecting polarizer of FIG. 6.

FIG. 7 is a diagram showing schematically the reflections from a liquid crystal display device incorporating a diffuse reflector.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
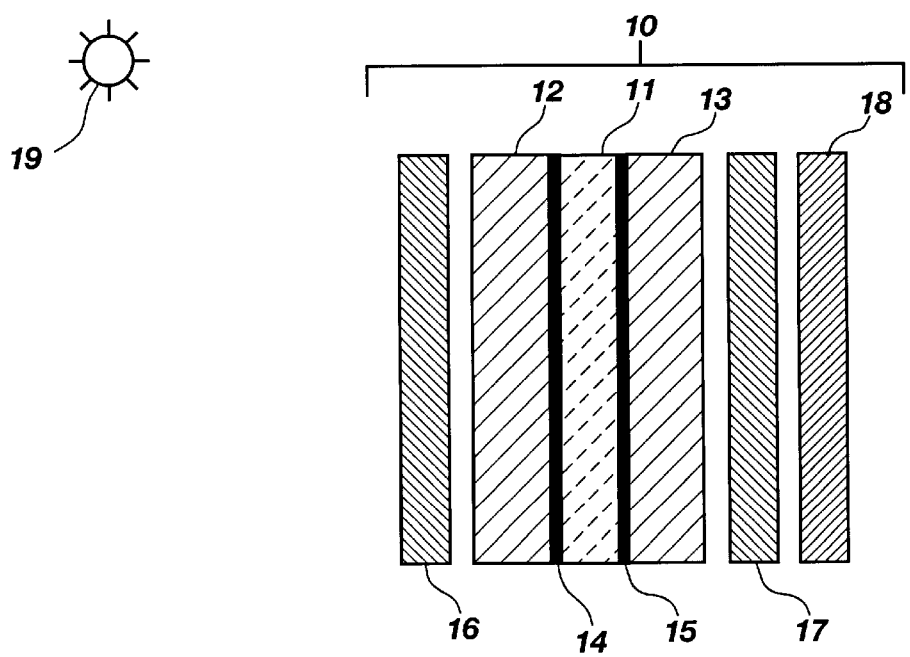
FIG. 1 is a cross sectional view of a typical ambient-illuminated twisted nematic liquid crystal display device of the type currently used in portable equipment.

In order to illustrate the features of the invention, it will be described with respect to an improved ambient illuminated, or reflective, twisted nematic liquid crystal display. However, as will become apparent from a reading of the specification, the invention is by no means limited to use with such a display. FIG. 1 is a cross sectional schematic of a conventional reflective is twisted nematic liquid crystal display 10. The display is comprised of a liquid crystal layer 11 sandwiched between a first transparent plate 12 and a second transparent plate 13. Each of these plates 12 and 13 has one or more transparent electrodes, 14 and 15 respectively, deposited on the surface of the plate 12 or 13 adjacent the liquid crystal material 11. A first polarizer 16 is positioned between the first glass plate 12 and a light source 19. A second polarizer 17 is positioned behind the second glass plate 13, and a diffuse reflector 18 is positioned behind the second polarizer 17.

Note that FIG. 1 is not to scale. In particular, the thickness of the liquid crystal layer 11 and the transparent electrodes 14 and 15 have been greatly exaggerated for clarity. The typical actual thickness of the transparent plates 12 and 13 is 0.5 to 1.1 millimeters. The thickness of the liquid crystal layer 11 and the transparent electrodes 14 and 15 are typically 0.004 mm and 0.0001 mm respectively.

By suitable treatment of the surfaces of the transparent plates 12 and 13, the molecules of the liquid crystal material 11 can be made to align parallel to the surface of the plates 12 and 13 and in a preferred direction. In a twisted nematic liquid crystal display, the transparent plates 12 and 13 are oriented such that the preferred direction of the liquid crystal on the first plate 12 is orthogonal to the orientation of the liquid crystal on the second plate 13. This orientation causes the twisted effect in the liquid crystal material in its relaxed state. This effect is described by Fergason (U.S. Pat. No. 3,731,986).

The first polarizer 16 is oriented such that it transmits light with the direction of polarization oriented parallel to the liquid crystal molecules at the surface of the first transparent plate 12, and the second polarizer 17 is oriented such that it transmits light with the polarization direction orthogonal to that of the first polarizer 16.

In the absence of an applied voltage, the liquid crystal material is in its relaxed state. Light transmitted through the first polarizer 16 enters the liquid crystal layer 11. The twist in the orientation of the liquid crystal molecules causes the polarization vector of the light to rotate by 90 degrees as the light passes through the liquid crystal layer 11, such that the light exits the liquid crystal layer 11 with the polarization vector oriented as required to pass through the second polarizer 17 with minimal absorption. The light reflects from the reflector 18, and passes back through the polarizers 16 and 17 and liquid crystal layer 11 in the reverse order with a similar effect. Thus, with no voltage applied, the display appears bright.

When a voltage is applied between the transparent electrodes 14 and 15, the liquid crystal molecules rotate towards alignment with the electric field, effectively untwisting the molecular orientation. In this event, light transmitted from the first polarizer 16 passes through the liquid crystal layer 11 without change in the direction of the polarization vector. Thus the light is unable to pass through the second polarizer 17 and is absorbed thereby. This absorption results in dark areas on the display surface corresponding to areas where an electric field is applied. By dividing the transparent electrodes into patterns, the display can be made to present symbols and other information.

Figure 2:
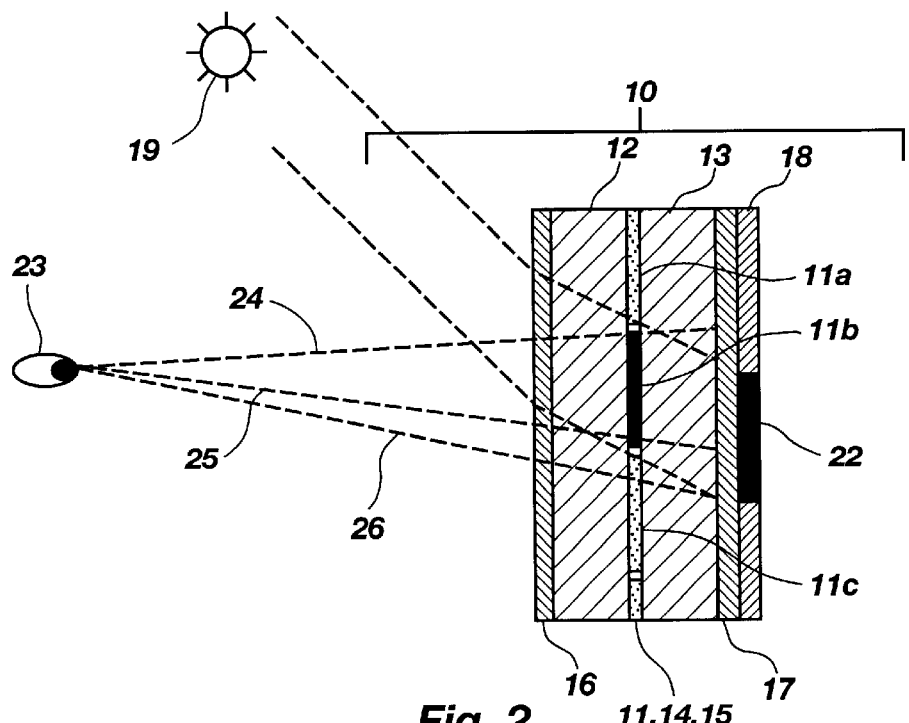
FIG. 2 is a diagram showing schematically the image shadow or parallax that occurs in a typical ambient-illuminated twisted nematic liquid crystal display.

FIG. 2 is a cross-sectional schematic which illustrates the major problem with conventional reflective-type twisted nematic liquid crystal displays. This schematic is similar to that of FIG. 1 except that the liquid crystal layer 11 and transparent electrodes 14 and 15 have been reduced in thickness. In addition, the liquid crystal layer 11 is shown divided into three segments, or picture elements, 11a, 11b and 11c, which can be independently controlled by corresponding segments of the transparent electrodes 14 and 15.

For this discussion, assume that an electric field is not applied to the liquid crystal material in picture elements 11a and 11c and the liquid crystal material is in the twisted state. In addition, assume that a voltage is applied to picture element 11b and the liquid crystal material is in its untwisted state. Thus the area of picture element 11b will be seen as dark. In addition, however, since the light that passes through picture element 11b is absorbed by the second polarizer 17, picture element 11b casts a dark shadow on the diffuse reflector 18, such that the area of the diffuse reflector, designated 22, is also dark. Thus, the apparent size of the dark picture element 11b is enlarged and the apparent size of the adjacent bright picture element 11c is reduced. Note that this effect is due to the parallax, or displacement, between the picture elements in the liquid crystal layer 11 and the diffuse reflector 18, and note that this effect places an upper limit on the resolution of the display.

It can be understood that the parallax effect could be eliminated if the reflector could be placed in intimate contact with the liquid crystal layer. In this case, since the reflector must be behind the second polarizer, both the polarizer and reflector would have to be within the liquid crystal display cell formed by the first and second glass plates. Conventional polarizers are generally made from a dyed and stretched polymer film that is not compatible with the processes used to construct the liquid crystal display cell. Moreover, since the film polarizer would be located between the liquid crystal layer and the electrodes on the second glass plate, the polarizer film would be electrically in series with the liquid crystal layer, which would greatly increase the voltage required to untwist the liquid crystal molecules.

Figure 3:
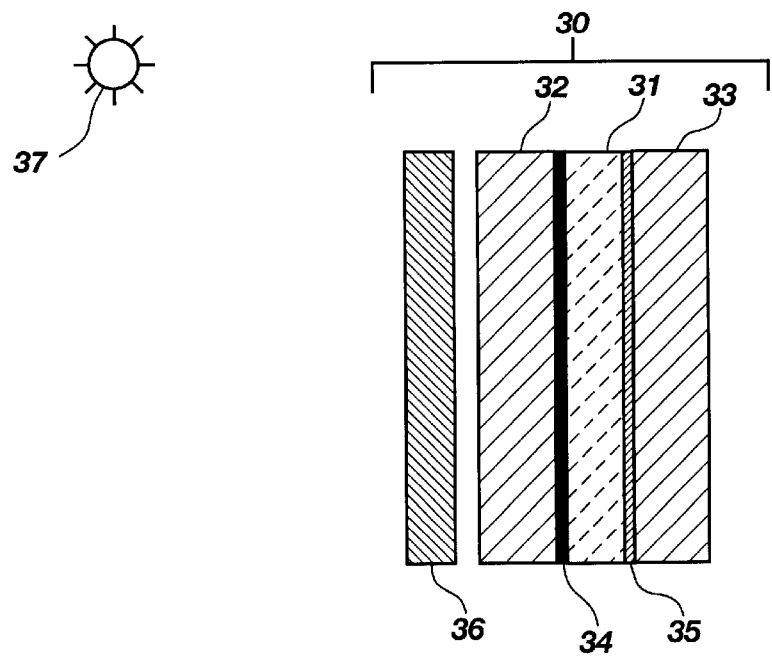
FIG. 3 is a cross sectional view of a liquid crystal display device incorporating a wire grid polarizer per Grinberg (U.S. Pat. No. 4,688,897).

FIG. 3 is a cross-sectional schematic of an improved reflective twisted nematic liquid crystal display 30 as described by Grinberg in U.S. Pat. No. 4,688,897. This display 30 is comprised of a layer of liquid crystal material 31 sandwiched between a front transparent plate 32 and a rear plate 33. The liquid crystal material is aligned to the surfaces of the glass plates 32 and 33 as previously described. The front plate 32 has a transparent electrode 34 deposited on the surface adjacent the liquid crystal material 31. A linear polarizer 36 is positioned between the front transparent plate 32 and the light source 37. The surface of the rear plate 33 adjacent to the liquid crystal layer 31 is coated with a grid of closely spaced parallel conductors 35. A grid of suitably spaced conductors will reflect an electromagnetic wave when the wave is polarized along the direction of the conductors, and will transmit an electromagnetic wave polarized orthogonal to the conductors. Thus, within the liquid crystal display device 30, the conductor grid 35 combines the functions of polarizer, reflector, and electrical contact to the liquid crystal layer 31. The reflection from the conductor grid 35 is specular, meaning that the angle of reflection will be equal to the angle of incidence on the opposing side of the normal to the reflector surface.

Figure 4:
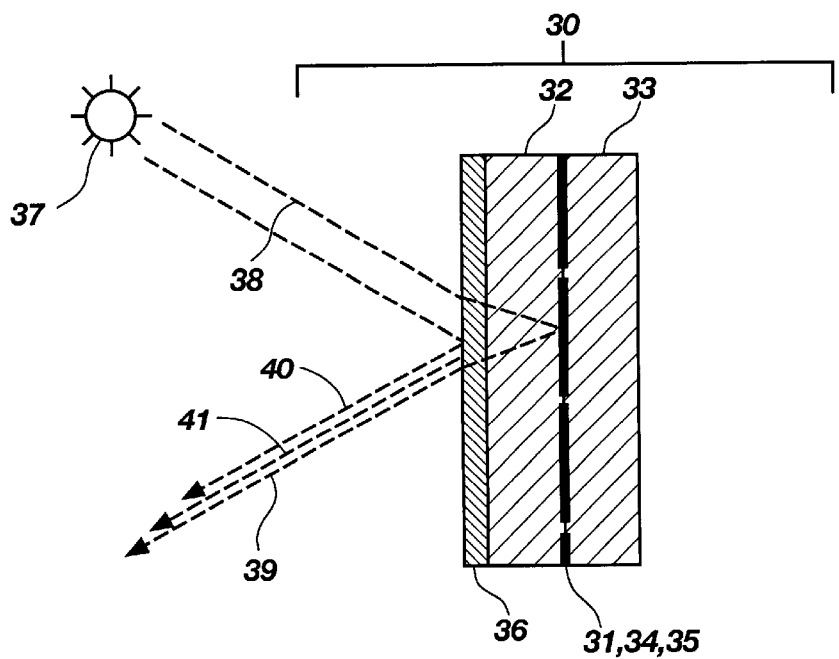
FIG. 4 is a diagram showing schematically the reflections from a liquid crystal display device incorporating a specular reflector.

FIG. 4 is a cross-sectional schematic of a liquid crystal display device 30 which illustrates the significant deficiency in the design described by Grinberg in U.S. Pat. No. 4,688,897. Light 38 from the source 37 is incident on the display 30. Some portion of this light reflects from the front surface of the display and from internal surfaces, as illustrated by light rays 40 and 41, respectively. These reflections will typically be a total of 5% of the incident light. Another portion of the light passes through the front polarizer 36 and is either reflected by the conductor grid 35, as illustrated by light ray 39, or is transmitted though the rear plate 33 to be absorbed. Typically 35% of the incident light will be reflected from the conductor grid 35 in areas where no voltage is applied to the liquid crystal layer 31, and 1% or less will be reflected in areas where a voltage is applied to the liquid crystal layer 31. The key deficiency with this design is that light rays 39, 40, and 41 are all parallel, and the brightness seen by an observer is the sum of these components. Thus the contrast ratio, or ratio of the brightness of the light areas to the brightness of the dark picture elements, will be no higher than (35%+5%)/(1%+5%) or about 7 to 1. Moreover, since light rays 39, 40, and 41 are parallel, color bands or fringes may be observed under certain types of lighting due to interference between these three beams.

Figures 5A, 5B:
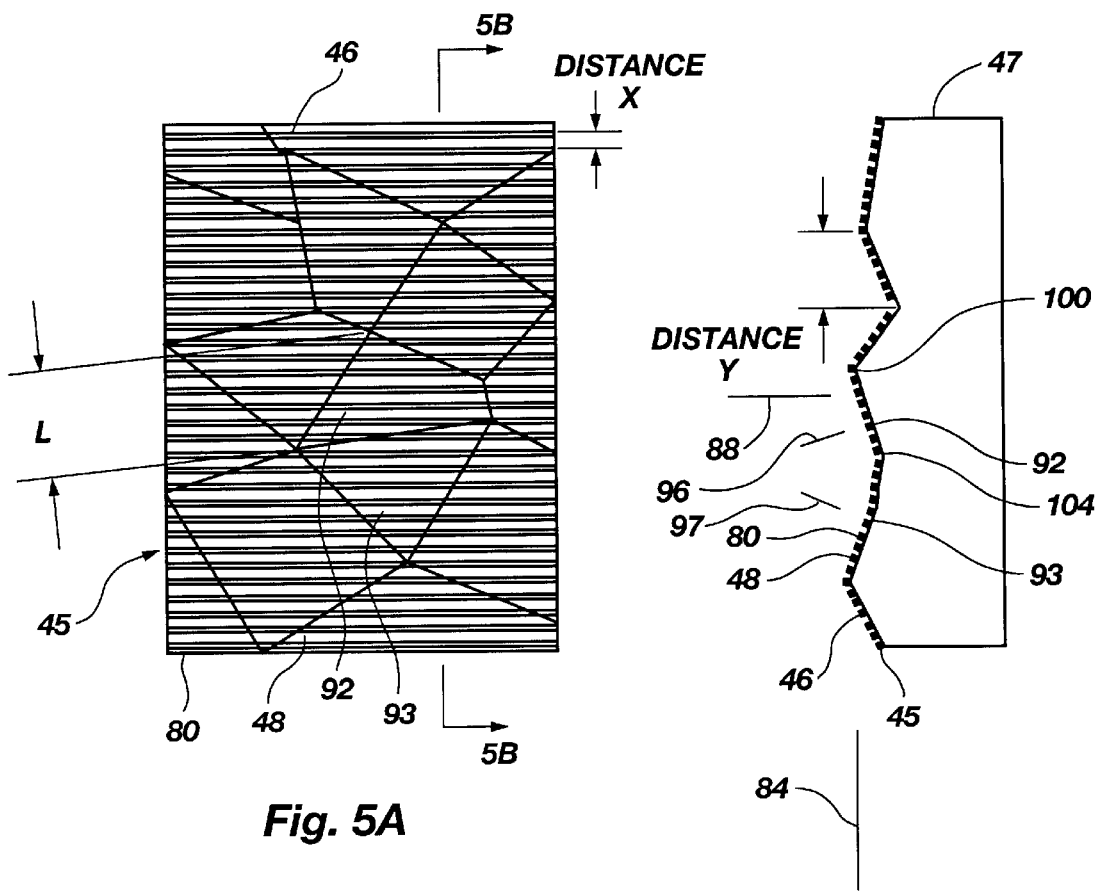
FIG. 5A is a cross sectional view of a diffuse reflecting polarizer in accordance with the preferred embodiment of this invention.
FIG. 5B is a plan view of a diffuse reflecting polarizer in accordance the preferred embodiment of this invention.

FIGS. 5A and 5B depict a plan view and cross sectional view of a polarizer device 45 capable of distributing light in a controlled manner in accordance with the present invention. The polarizer device 45 is comprised of a grid of closely spaced conductive elements 46 supported on a substrate 47, as shown in FIG. 5B. The upper surface 48 of the conductive elements has been given a texture by appropriate means. The surface texture of the surface 48 is controlled such that the surface normal varies in a manner calculated to distribute light by specular reflection into the region corresponding to the viewing angles desired for the liquid crystal display. Diffraction by facets may also contribute to the distribution of light. While FIGS. 5a and 5b implies a surface comprised of random planes or facets, a continuously varying surface texture would also be effective so long as care is taken to avoid the interference effects that can occur with reflections from periodic structures. Reflections from periodic structures are discussed by Lavin in "Specular Reflection", American Elsevier Publishing Company.

For the device of FIGS. 5a and 5b to work as an efficient polarizer, the spacing of the adjacent conductive elements, Distance X, must be small compared to the wavelength of the electromagnetic radiation being polarized. Distance X would be in the range of 0.005 microns to 0.2 microns for use in the visible spectrum, with the smaller dimensions preferred, since this will increase the polarization performance of the wire grid. Additionally, for the polarizer to function efficiently, the size or diameter of the facets, Distance Y, must be large with respect to the wavelength. At the same time, for the device to have a uniform visual appearance, Distance Y must be small compared to the resolution of the unaided human visual system. Distance Y will normally fall in the range of 0.5 to 10 microns, though other ranges may be useful in particular applications.

When the polarizer device of the present invention is employed within a liquid crystal device, the vertical dimensions of the patterned or roughened surface also become important. The thickness of the liquid crystal material in a typical display lies within the range of 3 to 5 micrometers. While this thickness can be increased for liquid crystal display devices which apply the present invention, the vertical dimension range of the patterned or roughened surface may be constrained. One manner of dealing with this constraint would be to decrease the maximum size of the Distance Y by dividing a facet which rises too high above the surface into two or more smaller facets such that the angle of the sides of the large facet is preserved in the angle of the sides of the smaller facets. This would have the effect of presenting approximately the same amount of surface area tilted at a certain angle to the incoming light to preserve the desired light distribution, while reducing the vertical dimension range. Care must be taken, however, to avoid undesirable diffraction effects. Another manner of dealing with constraints in the vertical dimensions of the substrate would be to overcoat the polarizer of the present invention with a thin film of material to planarize, or partially planarize, the surface. This overcoating need not be very thick (thickness on the order of 1 to 5 micrometers should be more than sufficient) nor is it necessary to make the surface perfectly flat in order to achieve the desired improvement. Of course, issues such as matching the optical index of the material used to that of the liquid crystal will be important in obtaining optimum performance. Other approaches for meeting the constraints imposed on the vertical dimension range by the liquid crystal material thickness will occur to those skilled in the art.

A variety of well-known techniques can be used to fabricate the diffuse reflecting polarizer device, and the choice of fabrication techniques is not critical to the invention as long as the appropriate specifications for the surface texture are met. A most straight forward approach would be to deposit and pattern a film of aluminum or silver directly onto a textured substrate. A variety of deposition and patterning techniques common to the semiconductor industry could be used to form a well-defined pattern over the textured surface so long as the method provides a sufficient depth of field. Holographic lithography, as described by Garvin in U.S. Pat. No. 4,049,944, or by Ferrante in U.S. Pat. No. 4,514,479, is a method that offers sufficient resolution and depth of field.

The desired surface texture of the underlying substrate could be obtained by mechanical abrasion of the substrate, such as grinding or sand-blasting or by chemical abrasion of the substrate, such as the well known use of dilute hydrofluoric acid to etch glass. Alternatively, a deformable material could be deposited on the substrate and then textured by embossing or by radiation assisted casting, as described by Shvartsman in U.S. Pat. No. 5,279,689. In still another method, the textured surface could be embossed or cast onto a continuous plastic film (for example, using the method described by Blenkhorn in U.S. Pat. No. 4,840,757) which could then be laminated to a rigid substrate.

Still another method for fabricating the diffuse reflective polarizer would be to deposit and pattern the grid of parallel conductors on a smooth surface comprised of a polymer film over a rigid substrate, and then emboss the surface texture using the method described by Zager in U.S. Pat. No. 5,466,319. Other combinations of fabrication techniques are surely possible within the scope of the invention.

Any process that casts or embosses the surface texture will require a metal tool, commonly called a shim, which is generally prepared by plating metal onto a surface relief pattern created in a photoresist layer. Techniques for creating a suitable randomly-textured photoresist layer are described by Dainty in an article entitled "Measurements of light scattering by a characterized random rough surface," in The Proceedings of the International Workshop on Modern Analysis of Scattering Phenomena, Sep. 1990, p. S30. An improved technique for fabricating textured surfaces with asymmetrical diffusing properties is described by Petersen in U.S. Pat. No. 5,609,939.

To characterize the texture, it is useful to define a reference plane generally parallel to the substrate material slab which is described as supporting the conductive elements. The reference plane can also be defined with respect to the texture in a number of ways, for example a suitable reference plane would be the plane defined by the condition that the average distance of the textured surface from the reference plane is zero, or some other useful value. This definition can be applied over the span of the polarizer device to define a global reference plane, or over only some local area of the polarizer device, as appropriate.

While FIG. 5*a* and 5*b* illustrates a single level grid of conductive elements of thickness approximately equal to the element width, known techniques for improving the performance of wire grid polarizers can also be applied. For example, the double level grid method described by Garvin in U.S. Pat. No. 4,289,381 or the overly thick conductor technique described by Keilmann in U.S. Pat. No. 5,177,635 could be employed if needed to improve the extinction ratio of the grid. It is also well known that variations in the width of the elements with respect to the center-to-center spacing, or period, can be used to enhance the grid extinction at the expense of the total amount of light reflected, or conversely, to increase the light reflected while decreasing the extinction of the grid. Other techniques and methods to improve the wire grid performance for particular applications will surely occur to those skilled in the art.

FIG. 6 is a cross sectional schematic diagram of an improved twisted nematic liquid crystal display device 60 intended for illumination from the viewer's side of the display only and FIG. 6A is an enlarged view thereof. This display 60 is comprised of a layer of liquid crystal material 61 sandwiched between a front transparent plate 62 and a rear plate 63 which supports the reflecting grid polarizer 65 on the surface adjacent the liquid crystal layer 61. The reflecting polarizer 65 is composed of a multiplicity of parallel conductive elements 67, deposited on a textured surface as previously described. The characteristics of the textured surface are chosen to control the distribution of light by specular reflection from the various portions of the surface in the manner previously described. The liquid crystal material is aligned to the surfaces of the glass plates 62 and 63 as previously described. A previously described planarizing layer 70 may also be introduced if necessary to flatten the surface for optimum performance of the liquid crystal material. The front plate 62 has a transparent electrode 64 deposited on the surface adjacent the liquid crystal material 61. A linear polarizer 66 is positioned between the front transparent plate 62 and the light source 69. Since the light that is transmitted through the grid polarizer 65 must be absorbed, the rear plate 63 can be absorbing, or an absorbing material 68, such as black paint, can be deposited on the back surface of the rear plate 63.

The linear polarizer 66 is one example of a polarizer means for polarizing the light so that only light having a single polarization, or a first polarization, is passed therethrough. Light having on orthogonal polarization orientation, or second polarization, may be absorbed. It is of course understood that polarizers have various efficiencies and that the linear polarizer 66 may pass a certain amount of light of the second polarization, as well as the first polarization, and absorb a certain amount of light of the first polarization along with the second polarization. Any polarizer means may be used for passing substantially only one polarization orientation of the light.

The liquid crystal material 61, and associated electrodes, is one example of a polarization altering means for selectively altering the polarization orientation of the light as it passes therethrough from the first polarization to the second polarization. It is of course understood that any polarization altering means may be used to selectively alter the polarization orientation of the light, including for example, the liquid crystal material described above with electrodes on either side thereof, or and electrode on the front side and a wire grid polarizer with shorting bars as discussed below, etc.

The reflecting polarizer 65 is one example of a reflective dispersing polarizer means for passing light of the first polarization and reflectively dispersing light of the second polarization. The reflecting polarizer 65 may have a generally parallel arrangement of thin, elongated, spaced apart elements 67. The elements 67 provide means for interacting with electromagnetic waves of the light to generally transmit light having a polarization orientation perpendicular to the elements, and reflect light having a polarization orientation parallel with the elements. Each element may have an exposed surface that together with the exposed surfaces of the other elements reflect a majority of the light of the second polarization in a diffuse manner, as discussed more fully below.

The absorbing material 68 is one example of an absorbing means for absorbing light of the first polarization after is passes through the reflecting polarizer 66.

FIG. 7 is a cross-sectional schematic that illustrates the improvement in display performance that occurs when a polarizer capable of controlling the distribution of light is incorporated within the twisted nematic display cell in accordance with the present invention. The construction of the display device 30 is identical to that previously shown in FIG. 3, except that the reflective polarizer 36 now reflects or distributes light over a controlled range of angles, as illustrated by multiple rays 39. An observer viewing the display at an angle about normal incidence will see only the light reflected from the polarizer, and the contrast of the display will not be reduced by the surface reflections 40 and 41. Thus, the display device 60, as illustrated in FIG. 6, manipulates light to create visible images by reflecting light visible by a viewer 23 (FIG. 2) defining a front in more than one orientation to produce an image visible over an angular range.

When used with a liquid crystal display device, the grid polarizer can serve as the electrical contact to the liquid crystal material as well as functioning as the polarizer and diffuse reflector. In this case, the grid must be divided into electrically isolated segments appropriate to the techniques employed to address the display picture elements. Moreover, within each of the isolated segments, the resistivity of the grid must be low enough to ensure that a uniform voltage is applied to the liquid crystal layer. Shorting bars, which connect the grid lines at intervals much longer than the wavelength of light may be incorporated to assure adequate electrical contact to the elongated elements of the isolated segments. These bars may be many micrometers in width if desired, and should be sparsely distributed about the surface in general. Typically, it would be desirable that they be narrow enough to avoid disrupting the pixelation of the display and narrow enough to not be visible to the unaided eye. They may be placed reasonably close together if necessary, though they should be much, much further apart than the wavelengths typical of visible light. If an inordinate number of them are used, they will adversely impact the performance of the polarizer because they will present a significant surface area which does not polarize the reflected light. Since they are capable of reflecting unpolarized light, they will appear brighter than the surrounding area to the unaided eye and may stand out if they are not reasonably narrow.

As indicated above, the textured surface of the polarizer device may be characterized in various ways, and the texture itself may take various forms. Referring again to FIGS. 5A and 5B, the polarizer device has a generally parallel arrangement of a plurality of thin, elongated, separated elements 46. The elongated elements 46 interact with the source light to (1) transmit light having a polarization orientation perpendicular to the elements 46 and defining a transmitted beam of a first polarization, and (2) reflect light having a polarization orientation parallel with the elements 46 and defining a reflected beam of a second polarization.

Each of the elongated elements 46 has an exposed surface 80 which may be an upper surface or generally opposite the surface 48 of the substrate 47. A majority of the exposed surfaces 80 have a textured structure. Thus, the exposed surfaces 80 of the elements 46 reflect a majority of the light in a diffuse manner or over a range of different angles.

Referring to FIG. 5B, as indicated above, a reference plane 84 may be defined. The reference plane 84 may be defined by the average mean height of the textured surface 48. The reference plane may be generally parallel with the substrate 47. A reference normal 88 may also be defined which is perpendicular to the reference plane 84.

The exposed surfaces 80 of the elements 46 may form a plurality of component surfaces 92 or facets. Each component facet 92 and 93 may have a component axis 96 and 97 which is generally normal with respect to the associated component surface. The component axes 96 and 97 form a range of different angles with respect to the common reference axis 88. Many of the component surfaces 92 and 93 may be generally non-coplanar and non-parallel with the reference plane 88. Alternatively, each component axis 96 and 97 may have a similar orientation with respect to the common reference axis 88, but have a different angular value than the reference axis 88 to reflect light in a non-specular manner with respect to the reference plane 84.

Many of the component surfaces 92 and 93 have an elevated portion 100 defining a peak, and a lowered portion 104 defining a valley. The component surfaces 92 and 93 have a variety of different elevations, or elevated contours, with respect to an effective mean height, or with respect to the reference plane 84. Referring to FIG. 5A, many of the component surfaces 92 and 93 have a diameter, size or length L defined by a distance across opposite sides of the component surfaces. The size or length L of a substantial number of component surfaces 92 and 93 is greater than the wavelength of visible or near visible light. Thus, the size or length L is preferably greater than about 0.4 microns. The length L may be taken across the component surface in any desired orientation, including parallel with the elongated elements 46.

Figure 8A:
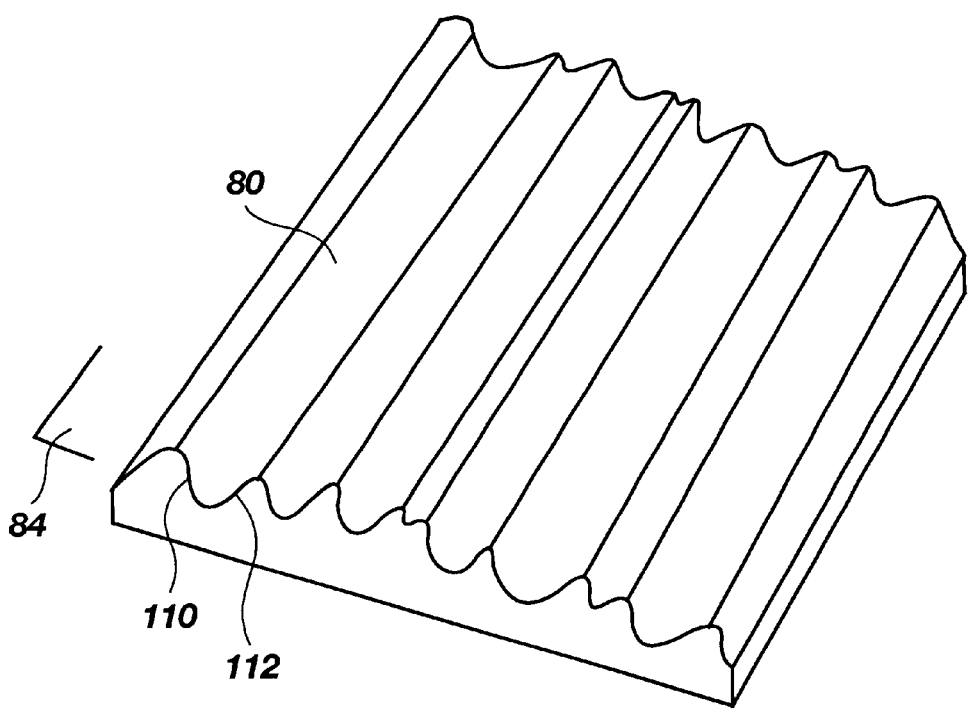
FIG. 8a is a perspective view of a polarizer device of the present invention.
Figure 8B:
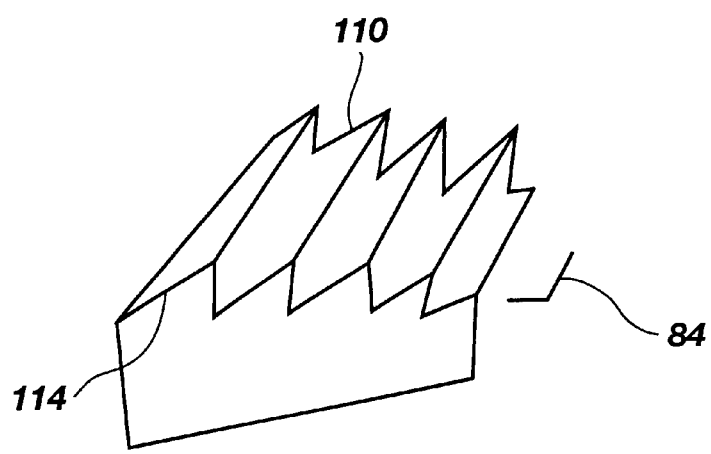
FIG. 8b is a perspective view of a polarizer device of the present invention.

Referring to FIGS. 8a and 8b, the exposed surfaces 80 of the elongated elements 46 may define a wavy cross section 110. The cross section is taken perpendicular to the reference plane 84.

The wavy cross section 110 may be periodic or irregular. In addition, the wavy cross section 110 may be formed by curved surfaces 112, as shown in FIG. 8a, or by planar surfaces 114, as shown in FIG. 8b. The wavy cross section 110 may be formed by saw toothed surfaces, or be a saw toothed cross section, as shown in FIG. 8b.

Figure 9A:
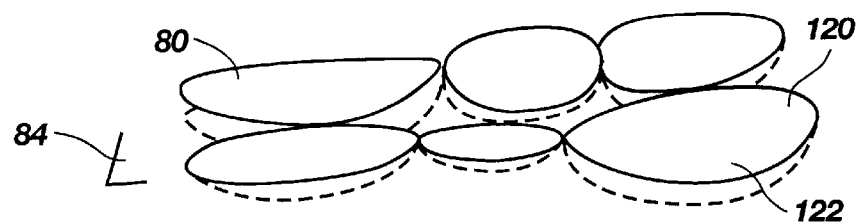
FIG. 9a is a perspective view of a polarizer device of the present invention.
Figure 9B:
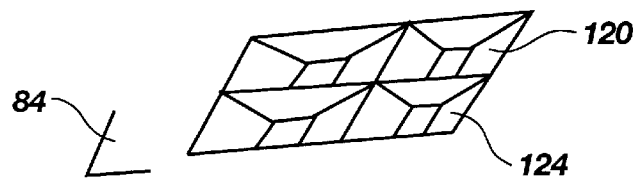
FIG. 9b is a perspective view of a polarizer device of the present invention.

Referring to FIGS. 9a and 9b, the exposed surfaces 80 of the elongated elements 46 may define a plurality of indentations 120.

The indentations 120 may have curved sides 122, or be concave, as shown in FIG. 9a, or they may have planar sides 124, as shown in FIG. 9b.

Figure 10:
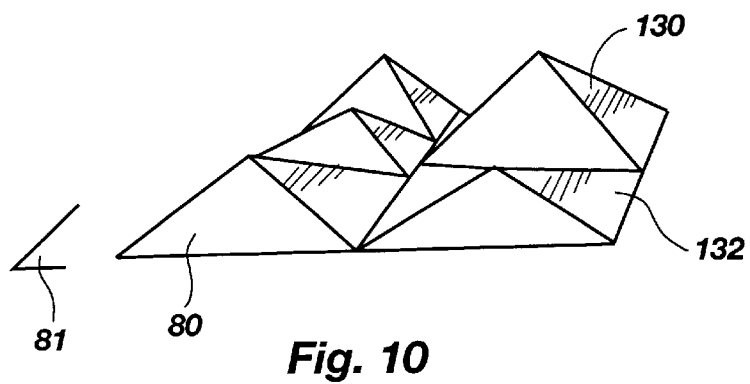
FIG. 10 is a perspective view of a polarizer device of the present invention.
Figure 11:
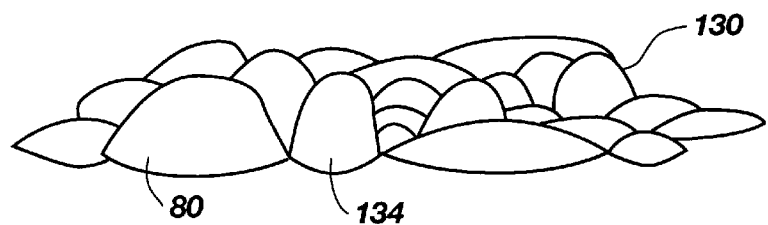
FIG. 11 is a perspective view of a polarizer device of the present invention.

Referring to FIGS. 10 and 11, the exposed surfaces 80 of the elongated elements 46 may define a plurality of protrusions 130. The protrusions may have planar sides 132, as shown in FIG. 10, or may have curved sides 134, or be convex, as shown in FIG. 11.

It is of course understood that the exposed surfaces of the elongated elements may be formed by the substrate which is itself textured to define the textured surface. In addition, it is understood that the exposed surfaces of the elements may form a wide variety of component surfaces. The component surfaces may be planer, curved, or some other combination. Preferably, a majority of the component surfaces are sized and configured to reflect the light in a diffuse manner or in a non-specular manner with respect to the reference plane. The exposed surfaces of the elongated elements define a textured surface. The textured surface may be defined by a distribution of spatial oscillations. The dominant or most fundamental oscillations preferably have a period greater than the wavelength of visible or near visible light, or greater than about 0.4 microns.

While the invention is disclosed and particular embodiments thereof are described in detail, it is not intended that the invention be limited solely to these embodiments. Many modifications will occur to those skilled in the art which are within the spirit and scope of the invention. For example, while the invention has been described in terms of a twisted nematic liquid crystal display, the invention is also applicable for use in other manners, including displays utilizing other liquid crystal materials or electro-optical effects. It is thus intended that the invention be limited in scope only by the appended claims.

What is claimed is:

1. A display apparatus for manipulating light to create visible images by transmitting and/or reflecting light visible by a viewer over an angular range, the viewer defining a front orientation, the apparatus comprising:
    a first polarizer means configured for polarizing the light so that only light having a single polarization orientation is passed therethrough, defining a first polarization;
    a polarization altering means disposed behind the first polarizer means and responsive to means for selectively altering the polarization orientation of the light as it passes therethrough from the first polarization to a second polarization;
    a reflective dispersing wire grid polarizer, disposed behind the polarization altering means, configured to pass light of the first polarization and reflectively disperse light of the second polarization back through the polarization altering means and first polarizer means, the wire grid polarizer having a generally parallel arrangement of thin, elongated, spaced apart elements, each elongated element having an exposed surface that together with the exposed surfaces of the other elements reflect a majority of the light of the second polarization in a diffuse manner, to thereby disperse the light in more than one orientation to produce an image visible over an angular range.

2. The display apparatus of claim 1, further comprising an absorbing means disposed behind the second polarizer for absorbing light of the first polarization after it passes through the wire grid polarizer.

3. A display apparatus in accordance with claim 1, wherein a majority of the exposed surfaces of the elongated elements include a textured structure configured to diffusely reflect a majority of the light of the second polarization over a range of different angles.

4. A display apparatus in accordance with claim 1, wherein a majority of the arrangement of elongated elements share a common general orientation with a reference plane and a common reference axis normal with respect to the reference plane; and wherein the exposed surfaces of the elements form a plurality of component surfaces each having a component axis generally normal with respect to the associated component surface, a plurality of the component axes forming a range of different angles with respect to the common reference axis.

5. A display apparatus in accordance with claim 1, wherein a majority of the arrangement of elongated elements share a common general orientation with a reference plane; and wherein the exposed surfaces of the elements form a plurality of component surfaces which are not generally coplanar or parallel with the reference plane.

6. A display apparatus in accordance with claim 1, wherein a majority of the exposed surfaces of the elongated elements includes a textured structure comprising a plurality of component surfaces, a majority of the textured structure being formed of component surfaces respectively having a length parallel with the elongated elements which is longer than the wavelength of visible or near visible light.

7. A display apparatus in accordance with claim 6, wherein the length of the component surfaces is between approximately 0.4 to 10 microns.

8. A display apparatus in accordance with claim 1, wherein a majority of the exposed surfaces of the elongated elements form a plurality of component surfaces, a majority of the component surfaces respectively having an elevated portion defining a peak and lowered portion defining a valley, each component surface having a size defined by a diameter between opposite sides, the diameter of a substantial number of component surfaces being greater than the wavelength of visible or near visible light.

9. A display apparatus in accordance with claim 1, wherein a majority of the exposed surfaces of the elongated elements form a plurality of component surfaces, a majority of the component surfaces respectively having an elevated portion defining a peak and lowered portion defining a valley, wherein at least some of the peaks have different elevations.

10. A display apparatus in accordance with claim 1, wherein a majority of the exposed surfaces of the elongated elements form a plurality of component surfaces, a majority of the component surfaces respectively having an elevated portion defining a peak and lowered portion defining a valley, wherein at least some of the valleys have different elevations.

11. A display apparatus in accordance with claim 1, wherein a majority of the exposed surfaces of the elongated elements includes a textured structure comprising a plurality of component surfaces, a majority of the textured structure being formed by component surfaces with respective diameters across the component surface greater than approximately 0.4 microns.

12. A display apparatus in accordance with claim 1, wherein a majority of the exposed surfaces of the elongated elements includes a textured structure comprising a plurality of component surfaces, a majority of the textured structure being defined by a distribution of spatial oscillations with dominant oscillations having a period greater than 0.4 microns.

13. A display apparatus in accordance with claim 1, wherein a majority of the elongated elements share a common general orientation with a reference plane; and wherein the exposed surfaces of the elongated elements define a generally wavy cross section taken perpendicular to the reference plane.

14. A display apparatus in accordance with claim 13, wherein the cross section is periodic.

15. A display apparatus in accordance with claim 13, wherein the cross section is irregular.

16. A display apparatus in accordance with claim 13, wherein the wavy cross section is defined by curved surfaces.

17. A display apparatus in accordance with claim 13, wherein the wavy cross section is defined by planer surfaces.

18. A display apparatus in accordance with claim 13, wherein the wavy cross section is defined by a saw toothed surface.

19. A display apparatus in accordance with claim 1, wherein the exposed surfaces of the elongated elements define a plurality of indentations.

20. A display apparatus in accordance with claim 19, wherein the indentations are concave.

21. A display apparatus in accordance with claim 19, wherein the indentations have planar sides.

22. A display apparatus in accordance with claim 1, wherein the exposed surfaces of the elongated elements define a plurality of protrusions.

23. A display apparatus in accordance with claim 22, wherein the protrusions are convex.

24. A display apparatus in accordance with claim 22, wherein the protrusions have planar sides.

25. A display apparatus in accordance with claim 1, further comprising a substrate with a textured surface; and wherein the generally parallel arrangement of a plurality of thin, elongated elements is disposed on the textured surface of the substrate, the textured surface of the substrate causing the exposed surfaces of the elongated elements to reflect in a diffuse manner.

26. A display apparatus in accordance with claim 1, further comprising electrical contact means electrically coupled to the elongated elements configured for establishing a field across the liquid crystal material.

27. A display apparatus in accordance with claim 26, wherein the electrical contact means comprises a plurality of shorting bars electrically coupled to the elongated elements.

28. A display apparatus in accordance with claim 1, wherein the plurality of elements are spaced-apart a distance between approximately 0.005 to 0.2 microns.

29. A display apparatus configured to manipulate light visible by a viewer defining a front orientation, the apparatus comprising:
   a first polarizer configured to substantially pass a first polarization therethrough;
   a polarization altering means, disposed behind the first polarizer, for selectively altering the polarization orientation of the light as it passes therethrough from the first polarization to a second polarization; and
   a reflective dispersing, wire grid polarizer, disposed behind the polarization altering means, configured to pass light of the first polarization and reflectively disperse light of the second polarization back through the polarization altering means and first polarizer; and
   the wire grid polarizer including 1) a substrate having a textured surface with a plurality of component surfaces, the component surfaces having an elevated portion defining a peak and a lowered portion defining a valley, a majority of the textured surface being formed by component surfaces with respective diameters greater than the wavelength of visible or near visible light, and 2) a generally parallel arrangement of elongated, separate elements, disposed on the textured surface of the substrate, which have surfaces that reflect a majority of the light of the second polarization in a diffuse manner; and
   the elements being configured to interact with electromagnetic waves of the light to generally (i) transmit light having a polarization orientation perpendicular to the elements, and (ii) reflect light having a polarization orientation parallel with the elements.

30. A display apparatus configured to manipulate light visible by a viewer defining a front orientation, the apparatus comprising:
   a first polarizer configured to substantially pass a first polarization therethrough;
   a polarization altering means, disposed behind the first polarizer, for selectively altering the polarization orientation of the light as it passes therethrough from the first polarization to a second polarization; and
   a wire grid polarizer having a generally parallel arrangement of elongated, separate elements, disposed behind the polarization altering means, the elements being configured to interact with electromagnetic waves of the light to generally (i) transmit light having a polarization orientation perpendicular to the elements, and (ii) reflect light having a polarization orientation parallel with the elements back through the polarization altering means and first polarizer; and
   the elongated elements having surfaces that together reflect a majority of the light of the second polarization in a diffuse manner.

31. A display apparatus in accordance with claim 29, wherein a majority of the textured structure is formed of component surfaces having a length parallel with the elongated elements which is longer than the wavelength of visible or near visible light.

32. A display apparatus in accordance with claim 29, wherein at least two of the component surfaces are oriented at different angles.

33. A display apparatus in accordance with claim 29, wherein the textured surface includes a plurality of indentations and a plurality of protrusions.

34. A display apparatus in accordance with claim 30, further comprising a substrate with a textured surface; and wherein the generally parallel arrangement of elements is disposed on the textured surface of the substrate, the textured surface of the substrate causing the exposed surfaces of the elongated elements to reflect in a diffuse manner.

35. A display apparatus in accordance with claim 30, wherein the surfaces of the elongated elements form a textured structure with a plurality of component surfaces having a length parallel with the elongated elements which is longer than the wavelength of visible or near visible light.

36. A display apparatus in accordance with claim 30, wherein the surfaces of the elongated elements form at least two component surfaces oriented at different angles.

37. A display apparatus in accordance with claim 30, wherein the surfaces of the elongated elements form a plurality of component surfaces, a majority of the component surfaces having an elevated portion defining a peak, and a lowered portion defining a valley.

38. A display apparatus in accordance with claim 30, wherein the surfaces of the elongated elements form a plurality of indentations and a plurality of protrusions.

39. A display apparatus for manipulating light to create visible images by transmitting and/or reflecting light visible by a viewer over an angular range, the viewer defining a front orientation, the apparatus comprising:
   a) a first polarizer configured to polarize the light so that substantially only light having a single polarization orientation is passed therethrough, defining a first polarization;
   b) a polarization altering means, disposed behind the first polarizer, responsive to means for selectively altering the polarization orientation of the light as it passes therethrough from the first polarization to a second polarization; and
   c) a reflective dispersing, second polarizer, disposed behind the polarization altering means, configured to pass light of the first polarization and reflectively disperse light of the second polarization back through the polarization altering means and first polarizer, the second polarizer including:
      1) a generally parallel arrangement of a plurality of thin, elongated, spaced-apart elements being narrower than the wavelength of visible light and providing means for interacting with electromagnetic waves of the source light beam to generally (i) transmit light having a polarization orientation perpendicular to the elements, and (ii) reflect light having a polarization orientation parallel with the elements; and
      2) each elongated element having an exposed surface that together with the exposed surfaces of the other elements reflect a majority of the light of the second polarization in a diffuse manner.

40. A display apparatus in accordance with claim 39, wherein the second polarizer is a wire grid polarizer.

41. A display apparatus in accordance with claim 39, wherein a majority of the exposed surfaces of the elongated elements includes a textured structure configured to diffusely reflect a majority of the light of the second polarization over a range of different angles.

42. A display apparatus in accordance with claim 39, wherein a majority of the arrangement of elongated elements share a common general orientation with a reference plane and a common reference axis normal with respect to the reference plane; and wherein the exposed surfaces of the elements form a plurality of component surfaces each having a component axis generally normal with respect to the associated component surface, a plurality of the component axes forming a range of different angles with respect to the common reference axis.

43. A display apparatus in accordance with claim 39, wherein a majority of the arrangement of elongated elements share a common general orientation with a reference plane; and wherein the exposed surfaces of the elements form a plurality of component surfaces which are not generally coplanar or parallel with the reference plane.

44. A display apparatus in accordance with claim 39, wherein a majority of the exposed surfaces of the elongated elements includes a textured structure comprising a plurality of component surfaces, a majority of the textured structure being formed of component surfaces respectively having a length parallel with the elongated elements which is longer than the wavelength of visible or near visible light.

45. A display apparatus in accordance with claim 44, wherein the length of the component surfaces is between approximately 0.4 to 10 microns.

46. A display apparatus in accordance with claim 39, wherein a majority of the exposed surfaces of the elongated elements form a plurality of component surfaces, a majority of the component surfaces respectively having an elevated portion defining a peak and lowered portion defining a valley, each component surface having a size defined by a diameter between opposite sides, the diameter of a substantial number of component surfaces being greater than the wavelength of visible or near visible light.

47. A display apparatus in accordance with claim 39, wherein the plurality of elements are spaced-apart a distance between approximately 0.005 to 0.2 microns.

48. A display apparatus in accordance with claim 39, wherein the exposed surfaces of the elements from a plurality of component surfaces, wherein a majority of component surfaces have an elevated portion defining a peak and a lowered portion defining a valley, and wherein at least some of the peaks have different elevations.

49. A display apparatus in accordance with claim 39, wherein the exposed surfaces of the elements from a plurality of component surfaces, wherein a majority of component surfaces have an elevated portion defining a peak and a lowered portion defining a valley, and wherein at least some of the valleys have different elevations.

50. A display apparatus in accordance with claim 39, wherein the generally parallel arrangement of a plurality of thin, elongated spaced-apart elements comprises a grid of elongated strips of conductive material.

51. A display apparatus configured to manipulate light visible by a viewer defining a front orientation, the apparatus comprising:

a) a first polarizer configured to substantially pass a first polarization therethrough;

b) polarization altering means, disposed behind the first polarizer, for selectively altering the polarization orientation of the light as it passes therethrough from the first polarization to a second polarization; and c) a wire grid polarizer, disposed behind the polarization altering means, having a generally parallel arrangement of elongated, conductive elements configured to interact with electromagnetic waves of the light to generally (i) transmit light having a polarization orientation perpendicular to the elements, and (ii) reflect light having a polarization orientation parallel with the elements back through the polarization altering means and first polarizer; and d) the elements having surfaces that together with the surfaces of other elements form a plurality of component surfaces respectively having an elevated portion defining a peak and a lowered portion defining a valley, a majority of the component surfaces having diameters greater than the wavelength of visible or near visible light to reflect a majority of the light of the second polarization in a diffuse manner.

* * * * *